United States Patent
Feda

(10) Patent No.: US 9,451,225 B2
(45) Date of Patent: Sep. 20, 2016

(54) COLOR AUGMENTED LOCAL AREA CONTRAST ENHANCEMENT

(75) Inventor: Francis M. Feda, Sudbury, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 281 days.

(21) Appl. No.: 13/571,826

(22) Filed: Aug. 10, 2012

(65) Prior Publication Data
US 2013/0038626 A1 Feb. 14, 2013

Related U.S. Application Data

(60) Provisional application No. 61/552,744, filed on Aug. 12, 2011.

(51) Int. Cl.
| | |
|---|---|
| G09G 5/02 | (2006.01) |
| G09G 5/00 | (2006.01) |
| H04N 9/64 | (2006.01) |
| G06T 5/00 | (2006.01) |
| H04N 5/33 | (2006.01) |

(52) U.S. Cl.
CPC .............. *H04N 9/646* (2013.01); *G06T 5/007* (2013.01); *G06T 2207/10024* (2013.01); *G06T 2207/20221* (2013.01); *H04N 5/33* (2013.01)

(58) Field of Classification Search
CPC ............. H04N 9/646; G06T 2207/20192; G06T 5/007–5/009; G06T 5/00; G09G 3/3406
See application file for complete search history.

(56) References Cited

U.S. PATENT DOCUMENTS

| | | | |
|---|---|---|---|
| 6,043,909 A | 3/2000 | Holub | |
| 7,333,670 B2 | 2/2008 | Sandrew | |
| 7,391,904 B2 | 6/2008 | Embler | |
| 7,430,303 B2 | 9/2008 | Sefcik et al. | |
| 7,433,079 B2 | 10/2008 | Kotani | |
| 2004/0105032 A1* | 6/2004 | Kim et al. | 348/607 |
| 2005/0099545 A1* | 5/2005 | Zhu | 348/630 |
| 2005/0163393 A1* | 7/2005 | Asari | 382/254 |
| 2008/0152231 A1 | 6/2008 | Gokturk et al. | |
| 2008/0212899 A1 | 9/2008 | Gokturk et al. | |
| 2008/0285853 A1* | 11/2008 | Bressan | 382/169 |
| 2011/0299772 A1* | 12/2011 | Janssen | 382/167 |
| 2012/0076404 A1* | 3/2012 | Bryant et al. | 382/167 |
| 2013/0116573 A1* | 5/2013 | Herman | A61B 5/0064 600/474 |

OTHER PUBLICATIONS

Yin et al, One color contrast enhanced infrared and visible image fusion method, Infrared Physics & Technology 53 (2010) 146-150, Available online Oct. 28, 2009, http://www.sciencedirect.com/science/article/pii/S1350449509001352.*

* cited by examiner

*Primary Examiner* — Tize Ma
(74) *Attorney, Agent, or Firm* — Maine Cernota & Rardin; Daniel J. Long

(57) ABSTRACT

A method and system for color enabled local area contrast enhancement, are provided by generating a first copy of an image; processing the first copy to locally enhance visual contrast in the image; generating a second copy of the image; processing the second copy of the image to provide at least one visual cue to radiant flux within the image incident on the focal plane pixels; displaying a combined image formed from the combination of the locally enhanced first copy and flux mapped the second copy.

7 Claims, 4 Drawing Sheets

COLOR AUGMENTED LOCAL AREA CONTRAST ENHANCEMENT

RELATED APPLICATIONS

This application claims the benefit of U.S. Provisional Application No. 61/522,744, filed Aug. 12, 2012. This application is herein incorporated by reference in its entirety for all purposes.

FIELD OF THE INVENTION

The present invention relates to imaging, more particularly to creating color augmented, enhanced-contrast images.

BACKGROUND OF THE INVENTION

Local area contrast enhancement (LACE) algorithms are employed in thermal imaging applications to improve local contrast in a scene, whereby the image contrast of each region is locally optimized. A potential detriment of this approach is that relative temperature information across the entire image as represented by individual pixel values is lost as a result of the local adjustment of these pixel values necessary to optimize contrast. Thus, objects of the same temperature in different regions of the image may have different pixel values; conversely, objects of different temperatures may appear to have similar pixel values. This loss of relative thermal information can be problematic in certain applications where a need to discriminate objects based on relative temperature exists (e.g. identifying the hot objects in an image). This discrimination ability may be compromised in LACE imagery.

The inherent operation of a LACE algorithm removes information related to the relative temperature difference of pixels across an image. A LACE algorithm adjusts pixel intensity values locally to improve contrast.

As a consequence, the relationship between pixel value and temperature otherwise inherent in thermal imagery is lost. As an example, in a tactical situation it may be necessary to discriminate a vehicle with a running engine (hot) from a vehicle where the engine had been running but had recently been shut off (cooler). In a conventional thermal image, the pixel values corresponding to the hot engine would have a higher display intensity than pixel values associated with the cooler engine. In a LACE enhanced image, the relationship between temperature and pixel intensity is lost. Thus, the higher intensity pixel values may actually represent the cooler engine, since pixel values are adjusted based on the intensity values of their neighbors.

Referring to FIG. 1 illustrating a traditional LACE image, the tree at the far left of the image is slightly whiter (brighter) than the circular image of the sun (right side of image). This would suggest that the tree was in fact higher in temperature than the sun, if this were conventional thermal imagery. Obviously this is not the case, and highlights the effect of LACE in removing relative temperature information from a scene in order to enhance contrast in the image.

This loss of relative temperature information is a fundamental detriment in applications where object discrimination based on temperature is important.

What is needed, therefore, are techniques for preserving relative temperature information in a color augmented LACE-enhanced image.

SUMMARY OF THE INVENTION

One embodiment of the present invention provides a system for local area contrast enhancement, the system comprising: a color visual display; an image processor, having first and second channels; the first channel mapping focal plane pixel values representing radiant flux incident on the focal plane pixels within a first copy of the image; the second channel processing a second copy of an image and locally enhancing contrast of the image; and the image processor configured to combine a locally contrast enhanced product of the second channel with a mapped product of the first channel such that the focal plane pixel values are represented by a first visual parameter in a defined relationship to the focal plane pixel values.

Another embodiment of the present invention provides such a system wherein the first visual parameter is color.

A further embodiment of the present invention provides such a system wherein the focal plane pixel value is represented by hue.

Yet another embodiment of the present invention provides such a system wherein the focal plane pixel value is represented by saturation.

A yet further embodiment of the present invention provides such a system further comprising a multiplexer whereby a user selects a first visual parameter for display of data from the focal plane pixel values.

Still another embodiment of the present invention provides such a system the first visual parameter is selected from the group of visual parameters consisting of luminance and color.

A still further embodiment of the present invention provides such a system wherein a second visual parameter which is not the same as the first visual parameter is assigned to the locally contrast enhanced product.

One embodiment of the present invention provides a method for color enabled local area contrast enhancement, the method comprising: generating a first copy of an image; processing the first copy to locally enhance visual contrast in the image; generating a second copy of the image; processing the second copy of the image to provide at least one visual cue to radiant flux incident on the focal plane pixels within the image; displaying a combined image formed from the combination of the locally enhanced first copy and flux mapped the second copy.

Another embodiment of the present invention provides such a method wherein the visual cue is color.

A further embodiment of the present invention provides such a method wherein the visual cue is luminance.

Yet another embodiment of the present invention provides such a method wherein the locally enhancing visual contrast comprises adjusting values of pixels within the image.

A yet further embodiment of the present invention provides such a method wherein the visual cue is one or more color properties selected from the group of color properties consisting of colorfulness, chroma, saturation, lightness, brightness and hue.

Still another embodiment of the present invention provides such a method further comprising selecting a visual cue from a plurality of visual cues offered to the user.

A still further embodiment of the present invention provides such a method further comprising providing a second visual cue, the second visual cue being different from the first visual cue, applied to the enhanced image contrast, and is selected from the visual cues consisting of consisting of luminance and color.

One embodiment of the present invention provides a method for local area contrast enhancement for imaging applications comprising: establishing display pixel intensity for a display pixel from local area contrast enhancement of a corresponding focal plane pixel, the display pixel intensity being the sum of the intensities of sub-pixels within the display pixel; establishing color of the display pixel by correlating a focal plane pixel value of the corresponding focal plane pixel to predefined ratios of the intensities of sub pixels within the display pixel.

Another embodiment of the present invention provides such a method wherein the focal plane pixel value is a function of irradiance.

A further embodiment of the present invention provides such a method wherein local area contrast enhancement of a corresponding focal plane pixel comprises adjusting the display pixel intensity based on values of neighboring focal plane pixels such that an output is a contrast enhanced image.

Still another embodiment of the present invention provides such a method wherein correlating a focal plane pixel value of the corresponding focal plane pixel to predefined ratios of the intensities of sub pixels within the display pixel uses a look up table.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 2:
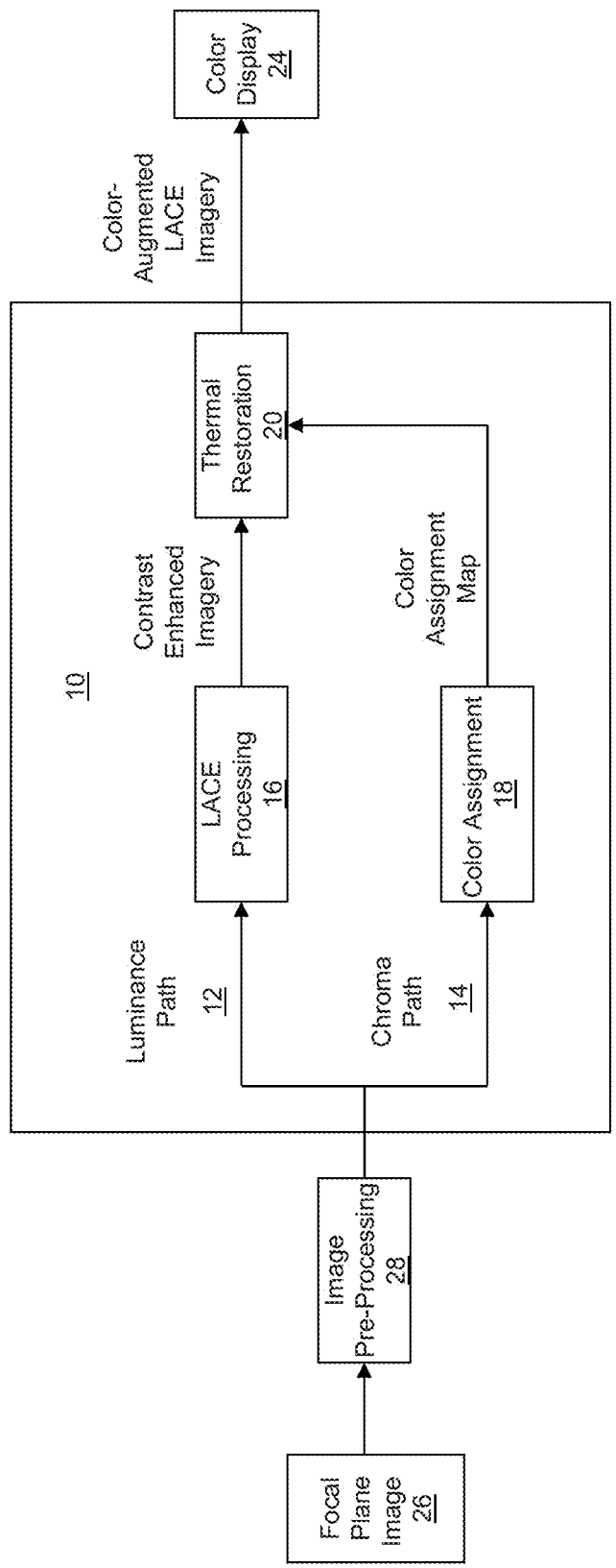
FIG. 2 is a block diagram of a local area contrast enhancement of an image retaining focal plane pixel value data configured in accord with one embodiment of the present invention.

A method, as illustrated in FIG. 2 of preserving the relative temperature information of pixel values across an image, while also realizing the benefits of a LACE-enhanced image is disclosed. Specifically, the ability to discriminate hot from cold pixels in a consistent manner across an image is preserved while also enhancing the ability to discern detail in an image.

Relative temperature differences in a scene can be restored through use of color to display thermal imagery. In the proposed method 10, an input image is processed in two parallel paths, luminance 12 and chroma 14, and subsequently combined to perform this restoration. In one embodiment, image processing along the luminance path 12 involves applying a LACE algorithm to the input image 16 to modify pixel intensity values as necessary to improve contrast in the image. Image processing along the chroma path 14 involves applying the input image to a color assignment algorithm 18, whereby individual pixels are assigned a color based on their relative values. For example, the progression of pixel values from minimum to maximum may map to a color spectrum progression from blue to red. Other color mappings are possible.

The color associated with each pixel is then used to modify the corresponding pixel value developed by the LACE-enhanced image 20. Each pixel in the LACE image may be comprised of red, green and blue color sub-pixels in a typical color display. While maintaining a constant overall pixel intensity, the values of the color sub-pixels are modified to adjust the color of the pixel to what was established in the color-map image 22.

The final result is a LACE-enhanced image such that the overall intensity of the pixel has been adjusted to enhance contrast, while the color of the pixel has been adjusted through manipulation of color sub-pixel values to show the relative temperature of that pixel 24. In this way, color is used to represent temperature in a consistent manner across the image, while LACE is used to adjust pixel intensity as a means to enhance contrast locally. Relative temperature differences are preserved across the image using color, while contrast is enhanced locally to improve the ability to discern image detail.

In an alternative embodiment, relative temperature information inherent to the input image is mapped to pixel intensity in the output image using a variant of the luminance processing path addressed above, and contrast information in the input image is mapped to color in the output image, as processed through a variant of the chroma processing path.

In one embodiment, image contrast and temperature information in an input image are mapped to pixel intensity and color respectively in an output image through processing along luminance and chroma image processing paths discussed below. In an alternative embodiment, the mapping is reversed. Specifically, image contrast and temperature information in an input image are mapped to pixel color and intensity respectively in an output image.

A LACE-enhanced image is designed to improve contrast across an image. LACE algorithms function by adjusting the intensity of pixel values, based in some way on the intensity values of neighboring pixels. However, while image contrast is enhanced, it is at the expense of losing relative pixel intensity information inherent in the original image.

In thermal imaging applications, focal plane pixel values are typically representative of the radiant flux incident on the pixel, which in turn is generally indicative of the temperature of the region of the scene visible to the pixel. Efforts are made to achieve consistency in pixel response across the entire focal plane, such that two pixel values of the same intensity represent regions of object space at the same temperature. Thus, it is possible to discern the relative temperatures of objects in a thermal image based on the intensities of pixels which comprise the individual objects.

LACE algorithms operate by adjusting the intensity value of each pixel based on the values of neighboring pixels to enhance contrast in the region local to each pixel. Since pixel values are individually manipulated based on local image content, any relationship between pixel value and temperature is lost. Pixels of the same intensity value as seen in a LACE image may in fact represent regions in the scene of different temperatures. Conversely, different regions of the scene at the same temperature may be represented in a LACE image by pixel values of different intensities.

Figure 1:
FIG. 1 is a local area contrast enhanced image generated according to a known method.

In contrast to the image of FIG. 1 one embodiment of the present invention describes a method for preserving relative temperature information in a LACE image while also realizing the benefits of LACE.

The proposed technique is based on use of color to display temperature information in the displayed thermal image. The overall intensity of the pixel is adjusted to achieve enhanced contrast based on the functioning of a LACE algorithm. Relative temperature information is preserved mapping relative temperature of pixels in the original image to pixel color in the LACE-processed image.

Each pixel of a color display is comprised of red, green and blue (RGB) sub-pixels. The perceived color of the pixel is based on the values of these color sub-pixels relative to one another. The overall intensity (brightness) of the pixel is based on the sum of the values of the individual sub-pixels comprising the pixel. Thus, pixel intensity can be adjusted independently of pixel color. In the proposed technique, displayed pixel intensity is established by the LACE algorithm operating on the input image. Displayed pixel color is established by mapping color to the relative pixel values intensities of the input image. This information is then combined to form a color-augmented LACE image.

Referring now to FIG. 2, a block diagram of one embodiment is shown. Typically, a raw image from a thermal imager focal plane 26 is presented to an image pre-processing block 28. In this block, routine image processing functions such as optical distortion correction, dead pixel elimination and non-uniformity correction (NUC) are applied to achieve an image such that the intensity values of individual pixels represent scene temperature in a consistent manner across the image. The output of the Image Pre-Processing block 28 is an image such that pixels of the same intensity value in various points of the image correspond to regions of similar temperature in the scene. In one embodiment, pixels respond to irradiance and not directly to temperature; pixel irradiance is heavily influenced by scene temperature, but can also be affected by other factors such as scene emissivity and atmospheric effects. It is understood by those trained in the art that due to these various influences, direct correspondence between pixel value and scene temperature is considered an approximation unless these other factors are specifically considered in a detailed system design.

The output from the Image Pre-Processing block 28 of FIG. 2 may be presented to two independent image processing paths 12, 14. There are two degrees of freedom associated with the display of a color pixel, the pixel intensity (luminance or brightness) 12 and the pixel color (chroma) 14. The Luminance image processing path 12 is used to establish the overall intensity of each individual pixel. The Chroma path 14 is used to establish the color of each individual pixel. The luminance and chroma information is then combined in the Thermal Restoration block 20 in such a way as to define the specific values of the color sub-pixels comprising each individual pixel in the image. The values of the color sub-pixels are then applied to the display to realize a color-augmented LACE image.

Luminance Processing

Processing of the image along the Luminance path consists of the application of an appropriate LACE algorithm to the image. Pixel intensities (pixel values) of the input image are operated on by a LACE algorithm and adjusted based on the values of neighboring pixels such that the output is a contrast enhanced image.

Typically, a LACE algorithm will perform histogram stretches or employ similar techniques to spread the pixel values out over the available dynamic range as a means to enhance image contrast. Since the algorithm operates independently on small regions of an overall image, the adjustment of pixel values in one image region may be different than in another. Consequently, any relationship between pixel value and scene temperature inherent in the input image is lost due to LACE processing. This information is captured in the Chroma processing chain and subsequently combined back into the LACE image.

Chroma Processing

Processing of the image along the Chroma path can be performed as the means to extract temperature information from the input image. Pixel values in the input image are directly representative of scene radiance, and thus related to scene temperature. Typically, the larger the pixel value the larger the irradiance on the pixel and thus the higher the temperature of the region of the scene visible to that pixel. By establishing a correspondence between pixel value and pixel color, a relationship between pixel temperature and pixel color can be developed.

Color assignment can be accomplished through a color lookup table (color LUT) which provides a defined relationship between color values and focal plane pixel values. The function of the LUT is to map the value of an input pixel to the color of the associated display pixel. In this table, there is an entry corresponding to each of the possible values of an input pixel. If for example, a pixel is represented by an 8-bit value, there are 256 possible values of the pixel and thus 256 entries in the color LUT. The pixel value functions as the index to the table. Individual colors can be mapped in any arbitrary manner to specific indexes, and thus to specific pixel values. Other defined relationships that are consistently applied such that focal plane pixel value data is transferred in a form recognizable to a user to the final image could also be used. Color assigned to pixel values may be varied by adjusting one or more of the properties of color, including but not limited to colorfulness, chroma, saturation, lightness, brightness and hue. Display of a color so defined in an RGB display is well understood by those skilled in the art.

A pixel in a color display is typically comprised of red, green and blue (RGB) color sub-pixels is shown. The relative intensity of sub-pixels to one another establishes the color as seen in the display. The color LUT contains the relative intensities of the RGB color sub-pixels necessary to create the specific color assigned to a particular input pixel value. Thus while two pixels may be different intensities if their sum is different, if the ratio of the intensities of the constituent sub pixels are the same the color will be preserved.

A typical implementation of a color LUT is shown in Table 1. The range of 8-bit pixel values from min (0) to max (255) represents temperature from cold-to-hot (for brevity, all possible pixel values are not shown). This is mapped to a color spectrum such that blue represents a cold pixel (minimum value) and red represents a hot pixel (maximum value). It should be appreciated that any arbitrary mapping of pixel value to color is possible. The relative intensities of the RGB color sub-pixels to realize the assigned color are also shown.

TABLE 1

| Input Pixel Value | Relative Temperature | Display Pixel - Color Assignment | Spectrum | Display Pixel - Color Sub-Pixel Relative Intensity | | |
|---|---|---|---|---|---|---|
| | | | | Red | Green | Blue |
| 255 | Hot | Red | Red | 1 | 0 | 0 |
| 192 | Warm | Orange | ↕ | 0.67 | 0.33 | 0 |
| 128 | Ambient | Yellow | | 0.5 | 0.5 | 0 |
| 64 | Cool | Green | | 0 | 1 | 0 |
| 0 | Cold | Blue | Blue | 0 | 0 | 1 |

For example, an input pixel value of 255 represents the maximum value of an input pixel which is representative of a hot portion of the scene. This value is to be mapped to the color red. The relative intensities of the color sub-pixels of the display pixel are shown to be 1, 0, 0 (RGB). That is, the red sub-pixel has maximum intensity, while the green and blue sub pixels are at minimum intensity.

An input pixel value of 192 maps to the color orange in this example, and is representative of a warm portion of the scene. To realize the color orange in a color display pixel, the relative intensities of the color sub-pixels must be, in RGB order, 0.67, 0.33, 0.0. The relative intensities of these color sub-pixels, corresponding to the value of the input pixel are then passed to the Thermal Restoration block.

Thermal Restoration

The Thermal Restoration block functions to combine the color information representative of pixel temperature into the LACE image. This may be done as follows. The intensity (brightness) of a color display pixel is established by the LACE algorithm. This intensity is representative of the sum of the values of the individual color sub-pixels that comprise the display pixel. The specific color of the pixel is determined by the relative intensities of the RGB sub-pixels as established by the color LUT. The Thermal Restoration block adjusts the final values of the RGB sub-pixels as necessary to meet the following two constraints:

1. The relative proportions of red, green blue as indicated by the color LUT are maintained
2. The sum of the pixel values are as indicated by the intensity value for that pixel as determined by the LACE algorithm.

These constraints can be met by scaling the LACE pixel intensity value by each of the color sub pixel relative intensity values. These become the final absolute values of the color RGB sub-pixels sent to the display.

As an example, start with an input image pixel value of, arbitrarily, 192. LACE processing of the input image changes this pixel value to 184, which represents the intensity of the corresponding pixel in the color display output. The starting value of 192 is also applied to the color LUT. In the example above, this value is mapped to the color orange. To realize this color, the relative intensities of the red, green and blue pixels are in the proportion of 0.67, 0.33, 0.00 respectively. The final value of the display pixel color sub pixels is found by taking the product of these values as shown below and in the following table.

Red sub pixel, final value: 192*0.67

Green sub-pixel, final value: 192*0.33

Blue sub-pixel, final value: 0*0.00

| Display Pixel, Color Sub-Pixel | LACE pixel intensity value (Color Display - Pixel Intensity) | Color LUT - Color Sub-Pixel, Relative Intensity | Display Pixel, Color Sub-Pixel Value |
|---|---|---|---|
| Red | 184 | 0.67 | 123 |
| Green | 184 | 0.33 | 61 |
| Blue | 184 | 0 | 0 |

Thus, for this example, the final values of the color sub-pixels in the color RGB display are 123, 61, 0 respectively.

Relative temperature information inherent in the input image can be used to develop color information that can be encoded into a LACE image. This color-encoded image can then be displayed on a color display whereby display pixel intensity values are contrast enhanced through LACE processing, and relative temperature information is represented by the color of the displayed pixel.

In the previous embodiment of this invention, image contrast and relative temperature information in the input image are mapped to pixel intensity and color respectively in the output image. In an alternative embodiment, the mapping is reversed. Contrast information and temperature information in the input image are mapped to color and pixel intensity information respectively in the output image. In this approach, regions of varying contrast are encoded through use of different colors, while relative temperature differences are encoded as intensity changes.

Figure 3:
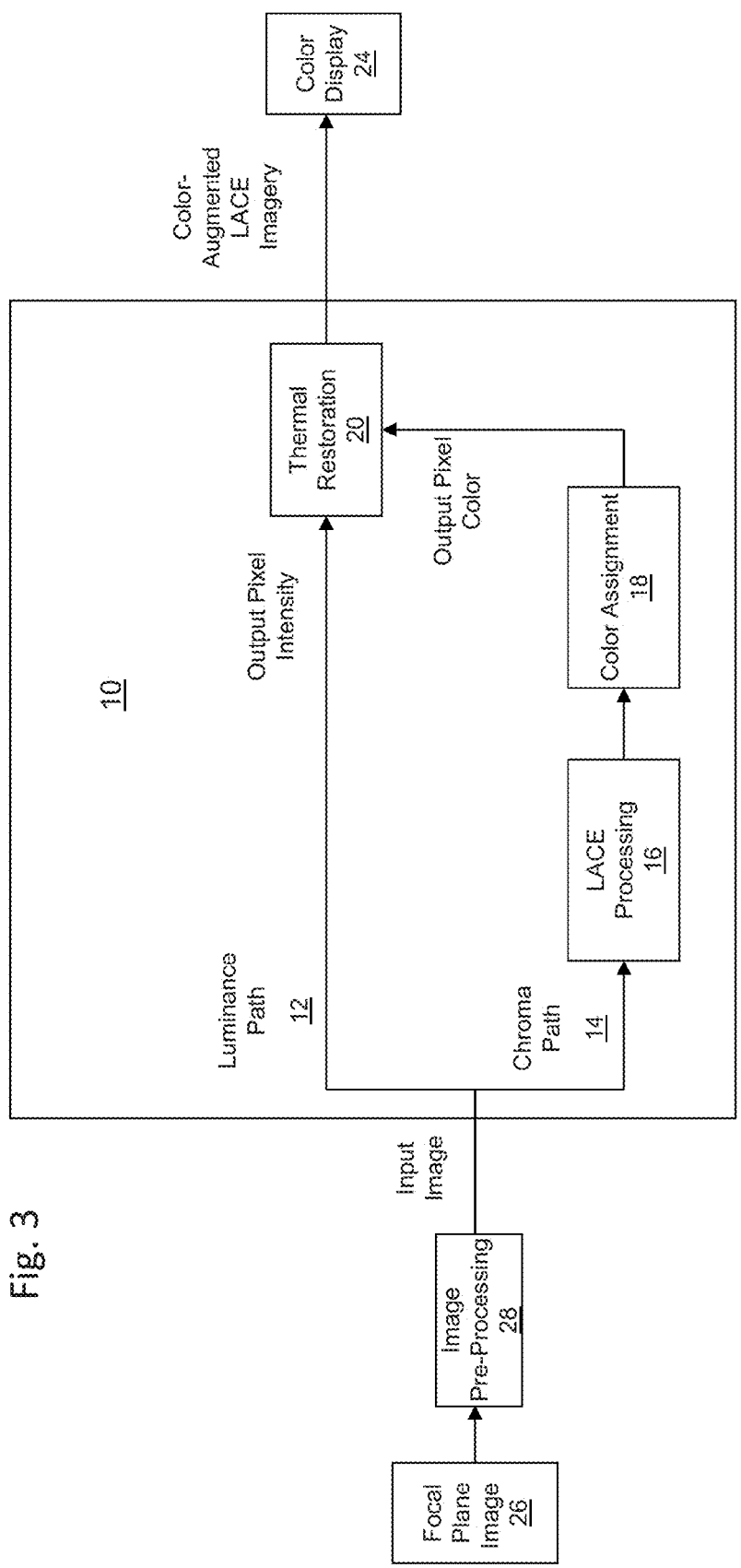
FIG. 3 is a block diagram of a local area contrast enhancement of an image retaining focal plane pixel value data configured in accord with an alternative embodiment of the present invention.

Referring to FIG. 3, a block diagram of the contrast and temperature encoding as color and intensity, respectively, is shown. The input image (output from any image preprocessing block) inherently contains relative temperature information as captured by the focal plane 26. In this embodiment, this input image is used to establish the intensity of the pixels in the display output.

The input image 26 is also applied to the LACE Processing block 16 as previously described. The output from the LACE processing block is a contrast enhanced image. Pixel intensity values of this image are then applied to the Color Assignment block 18 such that colors are mapped to individual pixel intensities in some arbitrary but defined manner. A color LUT may be used for this purpose as previously described. The output pixel intensity and color data is then presented to the Thermal Restoration 20 block. The final values of the RGB sub-pixels of each color pixel in the display output are then determined as before 24.

Figure 4:
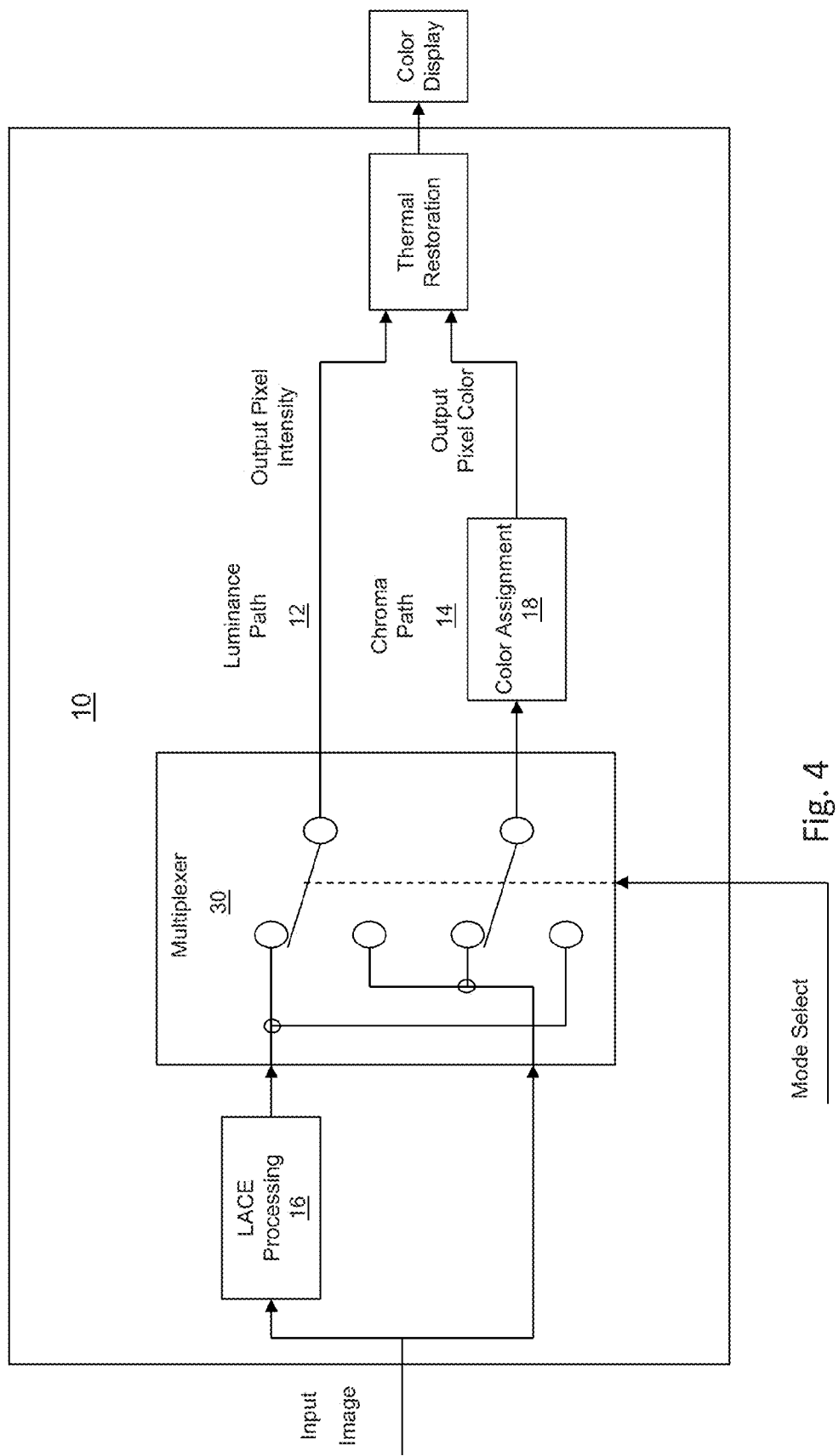
FIG. 4 is a block diagram of a local area contrast enhancement of an image retaining focal plane pixel value data configured in accord with an alternative embodiment of the present invention.

Referring now to FIG. 4, the contrast enhanced image output from the LACE Processing block 16 and the input image (output from any previous pre-processing) are applied to a multiplexer 30. This particular design combines both embodiments of this invention into a single implementation is shown. The purpose of the multiplexer 30 is to select which of the image streams is applied to the Luminance path 12 and which is applied to the Color Assignment path 14. Selection is implemented through use of a Mode Select input 32. This Mode Selection may be actuated by user input, or some other means including external image processing means. For example, external image processing may be performed to decide in some manner which mode will provide the most useful imagery to the user. The Mode Select 32 would be set based on this input.

With the multiplexer 30 switches in the positions shown in the figure, output pixel intensity is determined by the LACE image, while output pixel color is established by the relative temperature of the scene as represented by pixels values in the input image. With the multiplexer 30 switches in the other position, these roles are reversed. Color is used to represent contrast and pixel intensity is used to represent relative temperature in the output image presented to the color display.

Referring to FIG. 4, a multiplexed approach to implementing color-augmented LACE is shown. Note that in all of the prior discussion, reference was made to red/green/blue (RGB) representations of color pixels. It is understood that there are alternative representations of color, any of which may be used in various embodiments of this invention without any loss of generality or function. Most notably, HSL (Hue/Saturation/Luminance) or HSI (Hue/Saturation/Intensity) are common alternatives to the representation of color which are equivalent representations of the RGB description.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for retention of relative temperature information during local area contrast enhancement of monochrome imagery acquired from the focal plane of a thermal imager, the system comprising:
   a Red, Green, Blue color visual display;
   a thermal image processor, having first and second channels generating first and second copies of a single monochrome thermal image wherein focal plane pixel values represent irradiance of an area of a scene being viewed by a focal plane pixel incident on said focal plane pixel;
   said first channel maps, via a lookup table, said focal plane pixel values to Red, Green and Blue values, which drive the corresponding Red Green and Blue subpixels of said Red, Green, Blue color visual display, so as to preserve thermal temperature information of objects in said scene;
   said second channel separately processing said second copy of said monochrome thermal image and locally enhancing contrast of said monochrome thermal image;
   wherein a mapped product of said first channel is independent of a locally contrast enhanced product of said second channel and said locally contrast enhanced product of said second channel is independent of said mapped product of said first channel; and
   wherein said image processor is configured to combine, in said Red, Green, Blue color visual display, said locally contrast enhanced product of said second channel with said mapped product of said first channel.

2. The system of claim 1 further comprising a multiplexer whereby a user selects a first visual parameter for display of data from said focal plane pixel values.

3. The system of claim 2 wherein said first visual parameter is selected from the group of visual parameters consisting of luminance and color.

4. The system according to claim 3 wherein a second visual parameter which is not the same as said first visual parameter is assigned to said locally contrast enhanced product.

5. A method for color enabled local area contrast enhancement of thermal imagery, said method comprising:
   generating a first copy of a single monochrome thermal image;
   processing said first copy to locally enhance visual contrast in said first copy;
   generating a second copy of said monochrome thermal image;
   processing said second copy, separately from said first copy, of said monochrome thermal image to assign display Red, Green, Blue (RGB) subpixel values based on RGB color values from a lookup table to indicate intensity of irradiance incident on focal plane pixels within said monochrome thermal image from objects being viewed in said monochrome thermal image; and
   displaying, on an RGB display, a combined image formed from the combination of said locally contrast enhanced first copy and said irradiance mapped second copy, thereby preserving said combined image thermal information from said single monochrome thermal image in said RGB subpixel values.

6. The method of claim 5 wherein said locally enhancing visual contrast comprises adjusting values of pixels within said image.

7. The method of claim 5, wherein local enhancement of visual contrast of a corresponding focal plane pixel of said first copy of said single monochrome thermal image comprises adjusting display pixel intensity based on values of neighboring focal plane pixels such that an output is a contrast enhanced image.

* * * * *